(12) United States Patent
Bonforte et al.

(10) Patent No.: US 8,930,463 B2
(45) Date of Patent: Jan. 6, 2015

(54) SUPER-EMOTICONS

(75) Inventors: Jeffrey Bonforte, San Francisco, CA (US); Christopher T. Szeto, Sunnyvale, CA (US); Brian Kobashikawa, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1091 days.

(21) Appl. No.: 11/775,175

(22) Filed: Jul. 9, 2007

(65) Prior Publication Data

US 2009/0019117 A1    Jan. 15, 2009

(51) Int. Cl.
    *G06F 15/16*     (2006.01)
    *G06Q 10/10*     (2012.01)

(52) U.S. Cl.
    CPC .................................. *G06Q 10/107* (2013.01)
    USPC ............................ 709/206; 709/201; 709/202

(58) Field of Classification Search
    None
    See application file for complete search history.

(56) References Cited

U.S. PATENT DOCUMENTS

| | | | | |
|---|---|---|---|---|
| 5,812,639 | A * | 9/1998 | Bartholomew et al. | 370/352 |
| 6,772,121 | B1 * | 8/2004 | Kaneko | 704/270 |
| 6,772,195 | B1 * | 8/2004 | Hatlelid et al. | 709/204 |
| 6,937,730 | B1 * | 8/2005 | Buxton | 380/241 |
| 7,233,988 | B2 * | 6/2007 | Minakuchi et al. | 709/224 |
| 7,386,799 | B1 * | 6/2008 | Clanton et al. | 715/758 |
| 8,136,038 | B2 * | 3/2012 | Ross et al. | 715/706 |
| 8,171,084 | B2 * | 5/2012 | Walter et al. | 709/206 |
| 2004/0024822 | A1 * | 2/2004 | Werndorfer et al. | 709/206 |
| 2005/0078804 | A1 * | 4/2005 | Yomoda | 379/1.02 |
| 2005/0163379 | A1 * | 7/2005 | Zimmermann | 382/190 |
| 2005/0172120 | A1 * | 8/2005 | Wang et al. | 713/160 |
| 2006/0015560 | A1 * | 1/2006 | MacAuley et al. | 709/206 |
| 2006/0025220 | A1 * | 2/2006 | Macauley et al. | 463/42 |
| 2006/0041629 | A1 * | 2/2006 | Lira | 709/206 |
| 2006/0193509 | A1 * | 8/2006 | Criminisi et al. | 382/154 |
| 2006/0224546 | A1 * | 10/2006 | Ballin et al. | 706/62 |
| 2007/0061814 | A1 * | 3/2007 | Choi et al. | 719/313 |
| 2007/0213872 | A1 * | 9/2007 | Matsuzaki et al. | 700/245 |
| 2008/0201437 | A1 * | 8/2008 | Ludwig et al. | 709/206 |
| 2008/0247543 | A1 * | 10/2008 | Mick et al. | 380/201 |
| 2008/0303811 | A1 * | 12/2008 | Van Luchene | 345/419 |

* cited by examiner

*Primary Examiner* — Tammy Nguyen
*Assistant Examiner* — Keyvan Emdadi
(74) *Attorney, Agent, or Firm* — Hickman Palermo Truong Becker Bingham Wong LLP

(57) ABSTRACT

Techniques are described for generating and displaying "super-emoticons". Super-emoticons are similar to smileys in that they may be generated in response to a participant in a textual conversation entering a specific sequence of textual characters. However, super-emoticons differ from smileys in that super-emoticons are programmed to demonstrate more sophisticated behaviors, including but not limited to: moving out of the text insertion location, interacting with other display elements, interacting with users, changing appearance based on context, exhibiting randomly selected behaviors, and making use of information from services.

58 Claims, 3 Drawing Sheets

PER-EMOTICON INFORMATION

| 100 SUPER-EMOTICON ID |
|---|
| 102 NAME |
| 104 SETS |
| 106 BEHAVIORS |
| 108 SUBSCRIPTION TERMS |
| 110 TRIGGER STRING(S) |

PER-USER/PER-EMOTICON INFORMATION

| 150 SUPER-EMOTICON ID |
|---|
| 152 SUBSCRIPTION TYPE |
| 154 SUBSCRIPTON START |
| 156 POWER-LEVEL |
| 158 PER-BEHAVIOR POWER-LEVELS |
| 160 SCORES/STATISTICS |

PER-EMOTICON INFORMATION

| 100 SUPER-EMOTICON ID |
| 102 NAME |
| 104 SETS |
| 106 BEHAVIORS |
| 108 SUBSCRIPTION TERMS |
| 110 TRIGGER STRING(S) |

PER-USER/PER-EMOTICON INFORMATION

| 150 SUPER-EMOTICON ID |
| 152 SUBSCRIPTION TYPE |
| 154 SUBSCRIPTON START |
| 156 POWER-LEVEL |
| 158 PER-BEHAVIOR POWER-LEVELS |
| 160 SCORES/STATISTICS |

FIG. 1

;
SUPER-EMOTICONS

FIELD OF THE INVENTION

The present invention relates to messaging systems and, more specifically, to generating super-emoticons using a messaging system.

BACKGROUND

An emoticon is a sequence of printable characters, or a small image, intended to represent a human facial expression and convey an emotion. Emoticons were created to help people express their emotions in text messaging. The most common are :) ;) and :( Most modern messengers (e.g. instant messaging systems) will replace these simple text emoticons with more elaborate and even animated inline "smileys". When a messenger system replaces a text emoticon with an inline smiley, the inline smiley is displayed at the location, within the conversation window, in which the text emoticon would have been displayed. The location in which the text emoticon would have been displayed is referred to herein as the "text emoticon location".

Similar to text emoticons, once a smiley is displayed, the position of the smiley is fixed relative to the other elements of the conversation. For example, any scroll operation that affects the contents of a conversation window has the same effect on both the text and the smileys that are displayed within the conversation window. In addition, the animations of animated smileys occur within the confines of the initial display position of the animated smileys. While animated smileys may yawn, laugh, or even jiggle, they do so without departing from their initial display positions.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram that illustrates metadata that is associated with a super-emoticon according to an embodiment of the invention;

DETAILED DESCRIPTION

Figure 2:
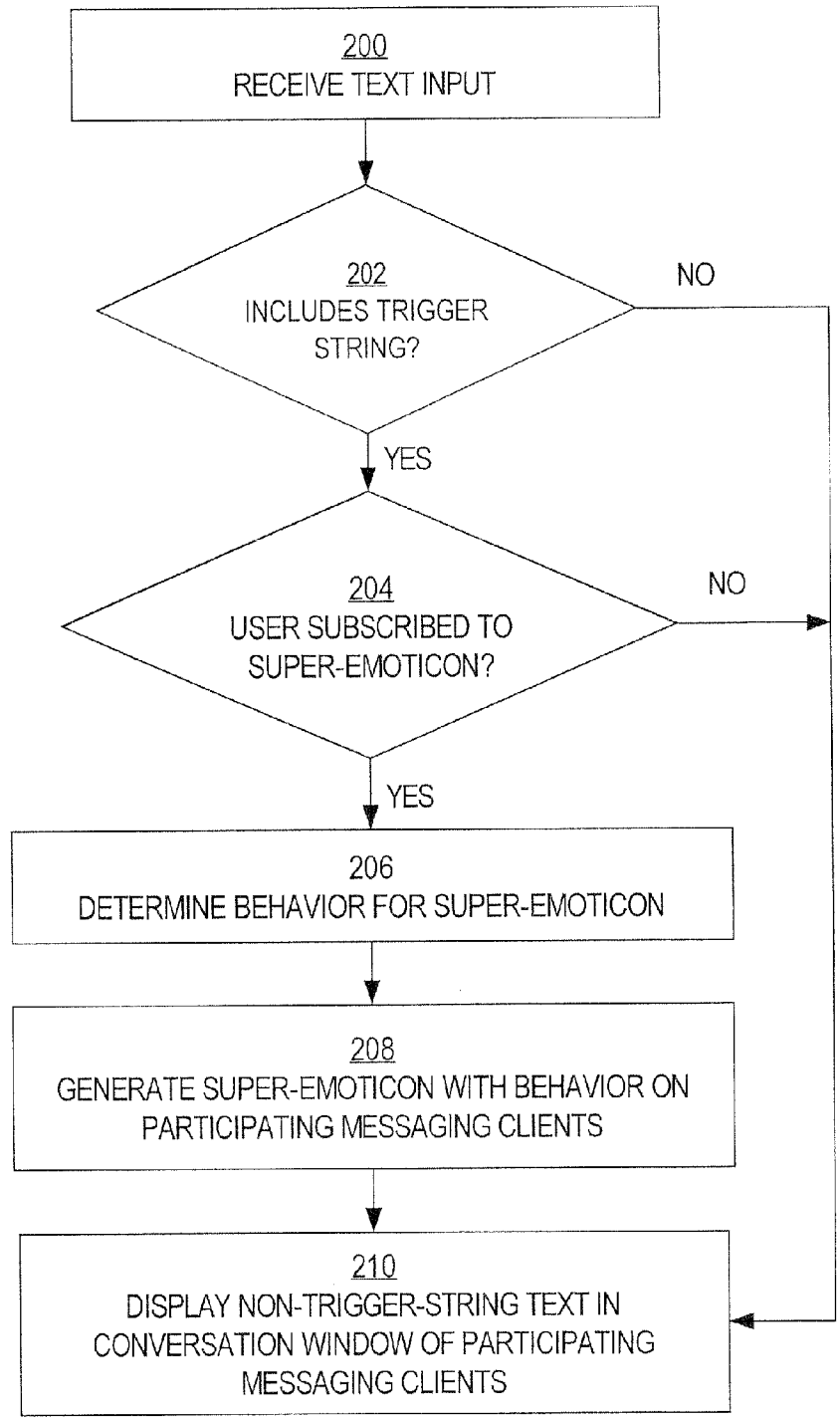
FIG. 2 is a flowchart illustrating steps performed by a message system according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described herein for generating and displaying "super-emoticons". Super-emoticons are similar to smileys in that they may be generated in response to a participant in a textual conversation entering a specific sequence of textual characters. However, super-emoticons differ from smileys in that super-emoticons are programmed to demonstrate more sophisticated behaviors, including but not limited to: moving out of the text emotion location, interacting with other display elements, interacting with users, changing appearance based on context, exhibiting randomly selected behaviors, and making use of information from external services.

Specifying a Super-Emoticon

Super-emoticons are specified in the same manner as conventional emoticons. Specifically, each super-emoticon is associated with a particular string of one or more textual characters. The string of textual characters with which a super-emoticon is associated is referred to herein as the "trigger string" for the super-emoticon.

A participant in a textual conversation specifies a super-emoticon by entering the trigger string of the super-emoticon in the text input interface of a message system client. Text entered into the text input interface of the message system client is sent to a message system server that is responsible for sending the text to the conversation windows of all message system clients that are participating in the textual conversation.

However, prior sending the text to the conversation windows of the participating message system clients, the message system server determines whether the text includes any trigger strings for super-emoticons. In response to detecting that the text includes a trigger string for a super-emoticon, the message system server generates the super-emoticon on the participating message system clients, instead of displaying the trigger string in the respective conversation windows.

According to one embodiment, the trigger string for super-emoticon for a given emotion is textually similar to the trigger string for a conventional smiley for the same emotion. For example, in one embodiment, the trigger string for a super-emoticon is created by combining a "common augmenter" with the trigger string of the corresponding convention emoticon. In an embodiment that uses a common augmenter, the same symbol (e.g., "!") can be applied to the trigger strings of multiple standard emoticons to unlock hidden animations, etc., thereby producing corresponding super-emoticons. Thus, the trigger string for the super-emoticon for happiness may be :-)! Similarly, the trigger string for sadness may be :-(! In these examples, the exclamation point serves as a common augmenter that is appended to the trigger strings of conventional emoticons. However, different symbols, characters or strings may be used in alternative embodiments. Further, the common augmenter may be used as a prefix, a suffix, or both, to the trigger string of the conventional smiley.

Instead of or in addition to trigger strings, the message system client may provide additional controls for specifying super-emoticons. For example, a message system client may include a drop-down or pop-up window that displays images of super-emoticons. Selecting an image from the window may send a message to the message system server to instruct the message system server to generate the corresponding super-emoticon on the participating message system clients. Other controls for specifying a super-emoticon may include "hot-keys", menus, buttons, etc. The techniques described herein are not limited to any particular mechanism for specifying a super-emoticon.

Departing from the Initial Display Position

According to one embodiment, super-emoticons are not confined to a specific display position. Instead, a super-emoticon may be positioned at and/or move to any location of a screen at which the messenger software client is allowed to draw.

For example, a super-emoticon may initially appear at a location other than the text emoticon location. The initial display location of the super-emoticon may be, for example, any corner of the conversation window, or any corner of the screen. The initial display location may be the center of the screen, with the super-emoticon initially displayed so large as to take up most of the screen (and then shrinking).

Further, even when the initial appearance of the super-emoticon is at the text emoticon location, the display location of the super-emoticon may change relative to the conversation into which the super-emoticon is placed. For example, a super-emoticon may initially appear at the text emoticon location, and then sprout legs, stand up, and walk off the screen. While walking off the screen, the super-emoticon may transition from the conversation window, to other parts of the display screen outside the conversation window, to off the screen completely.

As another example, a super-emoticon might bounce out of an instant messaging window, smack the screen with a thud, and slide down to the bottom of the monitor. There is virtually no limit with respect to where on the screen the super-emoticon will initially appear, and where on the screen the super-emoticon can go.

Interacting with Other Display Elements

According to one embodiment, a super-emoticon is associated with one or more behaviors. A behavior, in this context, refers to the appearance, actions, and/or interactive functionality of a super-emoticon. In one embodiment, the behaviors with which a super-emoticon may be associated include behaviors that cause the super-emoticon to interact with the environment in which the super-emoticon is displayed. For example, a super-emoticon may bounce around the screen, push windows around on the screen, hide user-interface controls (e.g. buttons), etc.

Super-emoticons may also interact with each other. For example, the behavior of a super-emoticon may hinge on whether another super-emoticon is in the same row. For example, a smiley super-emoticon next to a frowny super-emoticon may result in both emoticons transforming into cartoon ninjas that dual each other in place.

As another example, the "powers" of one super-emoticon may be affected by what other super-emoticons are present within the same conversation window. Thus, a "hero" super-emoticon may simply stay in the text emoticon location until a user enters a "villain" super-emoticon. However, when a "villain" super-emoticon is entered, the hero emoticon may fly from its initial display location toward the position of the villain super-emoticon. Once adjacent to the position of the villain super-emoticon, the hero super-emoticon may engage in battle with the villain super-emoticon. While the battle is raging, a user may enter text to create a "damsel" super-emoticon. The presence of the damsel super-emoticon within the conversation window may give the hero super-emoticon more powers to use against the villain. In addition, the villain may attempt to kidnap the damsel super-emoticon.

As another example, one super-emoticon may be designed to "merge" with another super-emoticon, where the merging of the super-emoticon transforms the two super-emoticons into a single super-emoticon that has behaviors of both of the two merged super-emoticons and/or behaviors different from either of the two merged super-emoticons. Once generated within a conversation, a super-emoticon that is designed to merge with another super-emoticon may remain in its initial state until another super-emoticon is generated within the same conversation. The generation of the other super-emoticon triggers the "merging" behavior of the first super-emoticon, causing the merging to occur.

According to one embodiment, a super-emoticon with a "merge" behavior may produce different results depending on the super-emoticon with which it merges. For example, a merger between super-emoticon A and super-emoticon B may produce a super-emoticon X. However, a merger between super-emoticon A with super-emoticon C may produce a super-emoticon Y, where super-emoticon Y exhibits different behaviors that super-emoticon X.

In addition to interacting with other super-emoticons, super-emoticons may also interact with non-animated screen elements. For example, a super-emoticon may walk over to a convention smiley that appears in the conversation window, and then shoot or otherwise destroy the conventional smiley. As another example, an "angry" super-emoticon may walk over to words that appear in the same conversation window, grab the words, and then scramble the words (or the letters within the words).

Random and Changing Behaviors

According to one embodiment, the behavior of super-emoticons may be unpredictable. For example, a single super-emoticon may be associated with five distinct behaviors. When a user enters the trigger string for the super-emoticon, a pseudo-random number generator may be used by the message system to randomly select between the five behaviors. Once a behavior of selected, a super-emoticon that exhibits the selected behavior is generated by the messaging clients participating in the conversation.

According to one embodiment, the behavior of a super-emoticon may change over time. For example, a messenger system may associate new behaviors with existing super-emoticons, and phase out older behaviors. Users may subscribe and/or pay for the use of super-emoticons on a super-emoticon basis, or on a behavior basis. Thus, a user may purchase new behaviors for the super-emoticons that the user is already using.

The behavior of a super-emoticon may also change based on how long a user has been using the super-emoticon. For example, on the day a user subscribes to a particular super-emoticon, the behavior of the super-emoticon may be quick, and the appearance of the super-emoticon may be youthful. Over time, the behavior of the super-emoticon may slow, and the appearance of the super-emoticon may become elderly.

Interacting with Users

As mentioned above, conventional emoticons sent by different users in a common conversation area can form super-emoticons. Consequently, the super-emoticon experience is not limited to one person generating several emoticons that become special. The serendipitous nature of super-emoticons emerging from normal emoticons (and phatic conversation) is more noticeable when the conditions that trigger the transformation involve multiple actors.

According to one embodiment, user interface components are integrated into super-emoticons to allow interactions between super-emoticons and users. For example, a "fly" super-emoticon may buzz around a user's screen until a user successfully clicks on the fly. When a user successfully clicks on the fly, the fly may "splat" and then gradually fade from the screen.

As another example, during a duel between two super-emoticons, a user may be able to interact with a user interface device to change the speed and/or power of a super-emoticon. For example, a super-emoticon may fight faster the faster a user presses certain keys on a keyboard. As another example, a super-emoticon may block better the faster a user moves a mouse.

As another example, a super-emoticon may interact with a user by following the cursor that is controlled by a mouse or trackball that is being manipulated by the user. In fact, super-emoticons may be generated with game logic, and code that detects various types of user interactions to implement a game. The system managing the conversation may include logic for tracking and displaying scores associated with the games associated with such super-emoticons.

Limited Use Super-Emoticons

According to one embodiment, per-user usage restrictions may be associated with super-emoticons. For example, a user may "subscribe" to a super-emoticon for a particular time period. During that time period, the messenger system generates the super-emoticon whenever the user enters a particular series of text characters. After that time period, the messenger system generates something else when the user enters the particular series of text characters. The "something else" may be the text character themselves, a conventional smiley, or a different super-emoticon.

The use limitations associated with a super-emoticon may be use based, rather than time-based. For example, a user may purchase fifty uses of a particular super-emoticon. In response to the purchase, a "uses-left" value stored for the user for that particular super-emoticon may be set to 50. Each time the messenger system generates the particular super-emoticon for the user, the uses-left value may be decremented. When the uses-left value reaches zero, the messenger system no longer generates the particular super-emoticon for that particular user.

Super-Emoticon Power Levels

As mentioned above, super-emoticons may be associated with one or more behaviors, where the behaviors may depend on a variety of factors such as which user caused generation of the super-emoticon, what other elements existed on the screen or in the conversation with the super-emoticon, how long the subscription to the super-emoticon has been in place, etc.

According to one embodiment, in addition to behaviors, super-emoticons are also associated with a power level. The power level associated with a super-emoticon may affect interactions between the super-emoticon and other elements. For example, consider a super-emoticon that has a behavior of pushing the conversation window around on the screen. If the "pushing" behavior is associated with a relatively low power level, then the super-emoticon may only be able to push the conversation window a small distance, or very slowly. On the other hand, if the "pushing" behavior is associated with a relatively high power level, then the super-emoticon may be able to push the conversation window a long distance, or very quickly.

As another example, when the super-emoticons of two users are competing (e.g. dueling, etc.), the relative power levels associated with the super-emoticons may be used as a factor in determining which super-emoticon "wins". For example, a ninja emoticon associated with power level 5 may have only a 25% change of beating a ninja emoticon associated with power level 10.

Power level information may be stored on a per-user basis, a per-user/per-super-emoticon basis, or a per-user/per-super-emoticon/per-behavior basis. When stored on a per-user basis, the power level associated with a particular user is applied to all super-emoticons generated by the particular user. When stored on a per-user/per-super-emoticon basis, the same user may have different power levels for different super-emoticons. When stored on a per-user/per-super-emoticon/per-behavior basis, the same user may have different power levels for different behaviors of the same super-emoticon.

Synergistic Super-Emoticons

According to one embodiment, super-emoticons have synergistic relationships with other super-emoticons. For example, if a super-emoticon X is displayed in a conversation that has no other super-emoticon, super-emoticon X may exhibit only one behavior. However, if the same conversation also includes a super-emoticon Y, then super-emoticon X may exhibit three behaviors. If super-emoticon Y and Z are present, then super-emoticon X may exhibit five behaviors.

In the example given above, synergistic effects were triggered by the presence of other super-emoticons within the same conversation. However, the synergistic effects may be triggered in other ways. For example, synergistic effects may be triggered based on subscriptions. For example, if a user is only subscribed to use super-emoticon X, super-emoticon X may have only one behavior. However, when that user subscribes to super-emoticon Y, then super-emoticon X (when generated by that user) may exhibit three behaviors. When that user also subscribes to super-emoticon Z, then super-emoticon (when generated by that user) may exhibit five behaviors.

Different synergies may exist between different super-emoticons. For example, super-emoticon X may exhibit behavior A when displayed alone, behaviors A and B when displayed with super-emoticon Y, and behaviors A and C when displayed with super-emoticon Z. Super-emoticons may belong to "sets", where each member of the "set" inherits a "set bonus" when the super-emoticon is owned and/or used with other members of the same set.

The synergies described above are behavior-based synergies. However, synergies may also affect the power-level of super-emoticons. For example, purchasing a subscription to super-emoticon Y may not give super-emoticon X any additional behaviors, but it may increase the power level associated with the behaviors of super-emoticon X. Thus, super-emoticons can become generally "stronger" as a user subscribes to and/or uses other super-emoticons.

Service-Based Super-Emoticons

According to one embodiment, super-emoticons may make use of information obtained by services external to the messaging system. For example, a super-emoticon may represent a "fan" of a particular professional sports team. When the instant messaging system receives user input that calls for generation of the super-emoticon, the instant messaging system may issue a request to a service that provides sports scores to obtain the final score of the most recent game of that sports team (or the current score, if a game is in progress). After obtaining the score from the external service, the messaging system may incorporate the score into the display of the super-emoticon. For example, if the team represented by the super-emoticon is ahead in the score, then the super-emoticon may be jumping with joy waving a banner that displays the score. On the other hand, if the team represented by the super-emoticon is behind in the score, then the super-emoticon may be angrily throwing watermelons at a scoreboard that displays the score.

A sports score service is merely one example of an external service upon which the appearance and/or behavior of a super-emoticon may be based. As another example, a super-emoticon may be designed with logic to retrieve, from a weather service, weather information that is local to each of the participants in the conversation. The super-emoticon may then display the appropriate weather information to each of the participants.

On the other hand, the logic associated with the super-emoticon may be designed to retrieve, from the weather service, weather information that is local to the user that is causing the super-emoticon to be displayed. The user may use such a super-emoticon, for example, to display to other participants in the conversation the user's own local weather.

The techniques described herein on not limited with respect to the types of service/information that is retrieved and used by super-emoticons, nor with respect to how the super-emoticons use the information thus retrieved. In some cases, the information retrieved from external services may not be directly displayed, but may nonetheless affect the appearance and/or behavior of the super-emoticon. Other super-emoticons may provide user interface controls that allow users to access information/functionality provided by external services, such as voice-over-IP services, shopping services, and software download services.

Some super-emoticons may obtain advertising information from ad servers, and present the advertising information when generated. Users who generate such advertisement super-emoticons may receive some form of compensation in response to other participants of the conversation clicking on the super-emoticon to obtain further information about an advertised product. The compensation may be monetary, or in the form of subscriptions to additional super-emoticons.

Programmable Super-Emoticons

According to one embodiment, users may be provided a user-interface that allows the user to specify the behavior of the super-emoticon. The user-interface may simply allow a user to specify one, or a sequence, of available behaviors. Alternatively, the user-interface may be a text box that allows a user to specify complex behaviors using a scripting language.

Super-Emoticon Metadata

Referring to FIG. 1, it is a block diagram that illustrates metadata that is associated with a super-emoticon according to an embodiment of the invention. The metadata may include per-emoticon information and per-user/per-emoticon information.

The per-emoticon information generally represents metadata that applies to a super-emoticon regardless of who is using the super-emoticon. The per-emoticon information may include, for example, a super-emoticon ID 100, a name 102, and an indication of the super-emoticon sets 104 to which the super-emoticon belongs.

The per-emoticon information may also include information that defines the behaviors 106 of the super-emoticon. The behavior 106 may include code which, when executed, implements the behavior of the super-emoticon. In this context, behavior refers to all aspects of the super-emoticon, including appearance, movement, and interactivity features. The code that implements the behavior may be executable code, executable scripts, binary code, etc. The same behavior may have different code implementations for different platforms.

The per-emoticon information may also include subscription terms 108, and the trigger string(s) 110 of the super-emoticon. As explained above, the subscription terms may be time-based or use based. Subscription terms may also specify conditions of use. For example, a particular super-emoticon may be free for all to use, but may only be used between the hours of 1 am and 3 am.

The per-user/per-emoticon information generally represents information, maintained by the messaging system, for each user, for each super-emoticon to which the user is subscribed. For example, the per-user/per-emoticon information may include the super-emoticon ID 150 of each super-emoticon to which the user is subscribed. The per-user/per-emoticon information may also include the subscription type 152, the start date for the subscription 154, the power level 156 of the super-emoticon, per-behavior power-levels 158, and scores/statistics 160. Scores/statistics 160 generally represents any information that is (a) generated in response to using the super-emoticon, and (b) is intended to persist between uses of the super-emoticon. For example, scores/statistics 160 may indicate the ending state of the last use of the super-emoticon. The ending state information may be used to begin a subsequent use of the super-emoticon in the same state in which the last use of the super-emoticon ended. Score/statistics 160 may also be used to store the win/loss ratio of super-emoticons that compete with other super-emoticons. Score/statistics 160 may also store a "high score" for an emoticon that has game-like functionality.

The various types of metadata illustrated in FIG. 1 are merely examples of the types of metadata that may be maintained by a messaging system that implements super-emoticons. However, the actual types of metadata may vary from implementation to implementation, and from super-emoticon to super-emoticon. For example, some implementations of super-emoticons may not make use of power-levels. In such an implementation, the per-user/per-emoticon information would not include power level 156 information, or per-behavior power-level 158 information.

Message System Operation

Referring to FIG. 2, it is a flowchart illustrating steps performed by a message system according to an embodiment of the invention. At step 200, the message system receives input from a user involved in a text conversation. Typically, the input would be in the form of text submitted through the interface provided by a message system client.

At step 202, the message system server determines whether the text includes a trigger string for a super-emoticon. If the text does not include a trigger string, then control passes to step 210 where the non-trigger-string text is displayed in the conversation windows of messaging clients that are participating the text conversation.

It should be noted that, depending on the sophistication of the messaging system, various additional steps may occur before step 210. For example, if the messaging system supports conventional smileys, then the messaging system server may replace emoticons within the text with smileys. As another example, the messaging system may add controls, special formatting, hyperlinks, etc. to the text prior to displaying the text in the conversation windows of the participating messaging clients.

If the text includes a trigger string for a super-emoticon, then control proceeds to step 204. At step 204, the messaging system server determines whether the user that submitted the text is subscribed to the super-emoticon associated with the trigger-string. If the user is not subscribed to the super-emoticon, then control passes to step 210. Otherwise, control passes to step 206.

At step 206, the messaging system determines the appropriate behavior for the super-emoticon. As described above, the appropriate behavior (including power level, appearance, etc.) may be determined by a variety of factors including what other content is present in the conversation, what other content is on the screen of each user, how long the user has subscribed to the super-emoticon, what other super-emoticons the user has subscriptions to, the results of a random number generation operation, etc.

At step 208, the super-emoticon, with the behavior determined in step 206, is generated by the participating messaging clients. At step 210 the non-trigger-string text is displayed in the conversation window of participating messaging clients.

Hardware Overview

Figure 3:
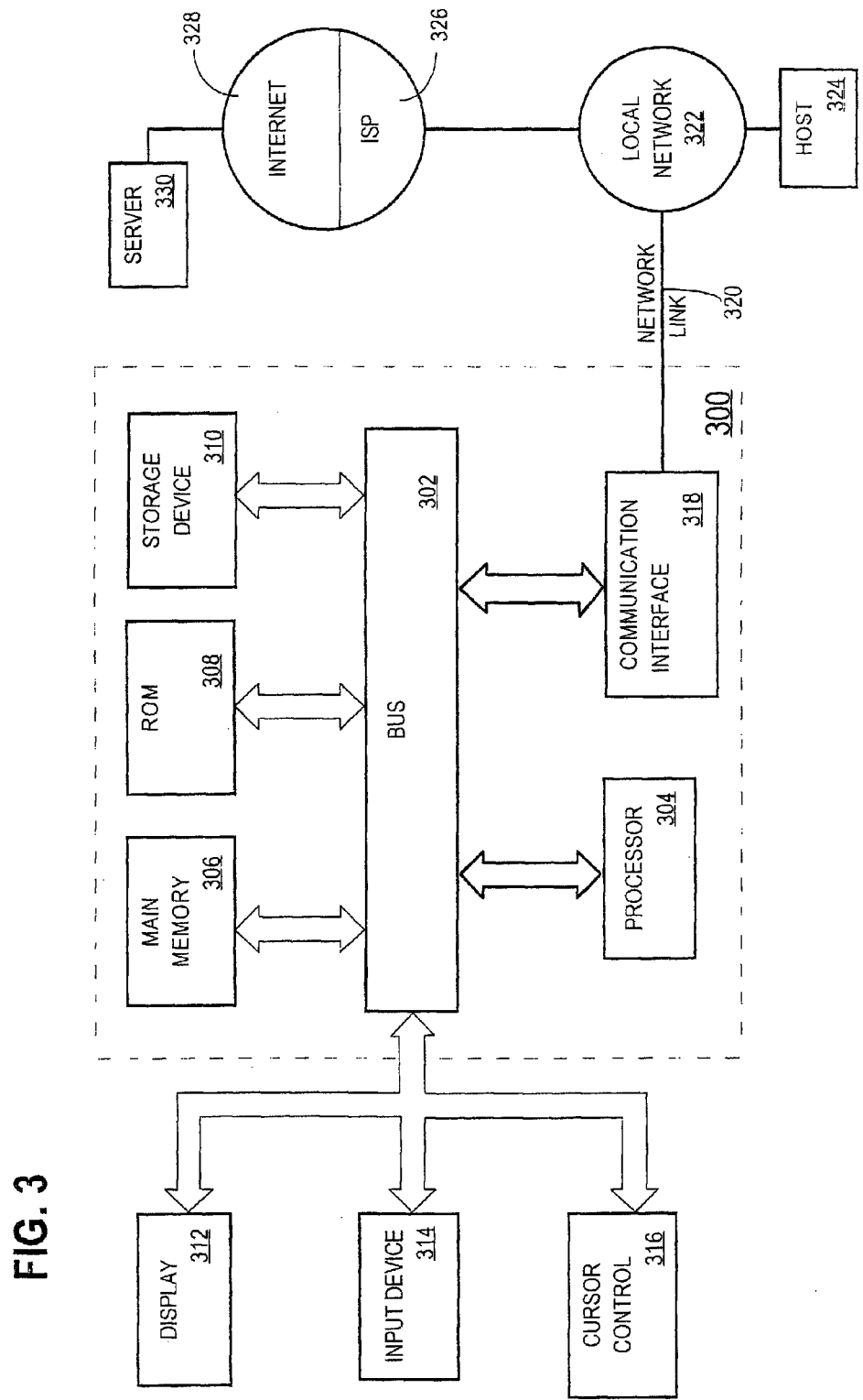
FIG. 3 is a block diagram illustrating a computer upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising the computer-implemented steps of:
   while a plurality of users are participating in a conversation, receiving a trigger string;
   wherein text of the conversation is displayed within a shared conversation window displayed by at least a first messaging client and a second messaging client;
   wherein, within the shared conversation window, a sequence in which text is entered determines a position of the text, relative to other text, in the shared conversation window;
   wherein the first messaging client and the second messaging client belong to a messaging system;
   wherein the trigger string was submitted through a text input interface provided by the first messaging client;
   in response to receiving the trigger string through the text input interface provided by the first messaging client, causing at least (a) the first messaging client and (b) the second messaging client to generate an initial display of a string-triggered visual image;
   wherein the initial display of the string-triggered visual image exhibits at least one of:
      a behavior that is based, at least in part, on information obtained, after the trigger string is received through the text input interface provided by the first messaging client, from a service external to said messaging system, wherein the information obtained from the service includes textual data, and the textual data is obtained by the messaging system without involving the first messaging client and the second messaging client;
      a behavior that causes the entire string-triggered visual image to move from a first position to a second position, wherein moving from the first position to the second position changes the position of the entire string-triggered visual image relative to other previously-displayed elements of the conversation in the shared conversation window;
      a behavior that is based, at least in part, on the presence of one or more other elements, distinct from the string-triggered visual image, displayed by the second messaging client, wherein the one or more other elements were displayed by the second messaging client before receiving the trigger string through the text input interface provided by the first messaging client;
      a behavior that causes the string-triggered visual image to interact with one or more other elements, distinct from the string-triggered visual image, displayed by the first messaging client and second messaging client, in a manner that affects the display of the one or more other elements, wherein the one or more other elements include at least one of: textual elements of the conversation or another string-triggered visual image, included in the conversation, associated with a different trigger string than the trigger string received through the text input interface provided by the first messaging client;
      a behavior that is affected with a power level associated with the string-triggered visual image;
      a behavior that is based, at least in part, on results produced by a pseudo-random number generator;
      a behavior that is manipulated by user input received through an input device after the trigger string is received through the text input interface provided by the first messaging client and the string-triggered visual image is displayed by the first messaging client and the second messaging client; or
      a behavior that is based, at least in part, on non-image data extracted from a profile maintained by said messaging system for a user from whom said trigger string was received;
   wherein said computer-implemented steps of said method are performed by one or more computing devices.

2. The method of claim 1 wherein the string-triggered visual image exhibits a behavior that is based, at least in part, on information obtained, after the trigger string is received through the text input interface provided by the first messaging client, from a service external to said messaging system, wherein the information obtained from the service includes textual data and the textual data is obtained by the messaging system without involving the first messaging client and the second messaging client.

3. The method of claim 2 wherein the string-triggered visual image visually displays information obtained from the service.

4. The method of claim 2 wherein the string-triggered visual image behaves in a manner that is based on information obtained from the service without displaying the information from the service.

5. The method of claim 2 further comprising obtaining the information from the service based on information, maintained by the message system, about the user from whom said input was received.

6. The method of claim 2 further comprising obtaining the information from the service based on information, maintained by the message system, about a user to whom the string-triggered visual image is to be displayed.

7. The method of claim 1 wherein the string-triggered visual image exhibits a behavior that causes the entire string-triggered visual image to move from a first position to a second position, wherein moving from the first position to the second position changes the position of the entire string-triggered visual image relative to other previously-displayed elements of the conversation in the shared conversation window.

8. The method of claim 7 wherein:
the input is textual input that includes a trigger string for the string-triggered visual image;
if displayed as text, the trigger string would be displayed at a particular text emoticon location within the conversation; and
the string-triggered visual image is initially displayed at a location other than the particular text emoticon location.

9. The method of claim 7 wherein:
the input is textual input that includes a trigger string for the string-triggered visual image;
if displayed as text, the trigger string would be displayed at a particular text emoticon location within the conversation; and
the string-triggered visual image is initially displayed at the particular text emoticon location, and then moves to a location other that the particular text emoticon location.

10. The method of claim 7 wherein:
the at least one messaging client displays the conversation in a shared conversation window that is displayed by a display device; and
the string-triggered visual image is displayed at or moves to a position on the display device that is outside the shared conversation window.

11. The method of claim 1 wherein the string-triggered visual image exhibits a behavior that is based, at least in part, on the presence of one or more other elements, distinct from the string-triggered visual image, displayed by the second messaging client, wherein the one or more other elements were displayed by the second messaging client before receiving the trigger string through the text input interface provided by the first messaging client.

12. The method of claim 11 wherein the behavior changes a characteristic of a window on a display screen.

13. The method of claim 12 wherein the characteristic is one of size or location.

14. The method of claim 11 wherein:
the string-triggered visual image is a first string-triggered visual image; and
the one or more other elements is a second string-triggered visual image that is generated as part of said conversation.

15. The method of claim 14 wherein the behavior includes interacting with said second string-triggered visual image.

16. The method of claim 15 wherein the second string-triggered visual image is associated with a behavior that causes the second string-triggered visual image to interact with said first string-triggered visual image.

17. The method of claim 11 wherein the one or more other elements includes text displayed in a display screen.

18. The method of claim 17 wherein the string-triggered visual image interacts with text that is displayed as part of said conversation.

19. The method of claim 1 wherein the string-triggered visual image exhibits a behavior that is based, at least in part, on results produced by a pseudo-random number generator.

20. The method of claim 1 wherein the string-triggered visual image exhibits a behavior that is manipulated by user input received through an input device after the trigger string is received through the text input interface provided by the first messaging client and the string-triggered visual image is displayed by the first messaging client and the second messaging client.

21. The method of claim 20 wherein movement of said string-triggered visual image is affected by manipulation of a user input device.

22. The method of claim 20 wherein the string-triggered visual image includes user interface logic for receiving input.

23. The method of claim 22 wherein the messaging system stores data, in association with a particular user, based on said particular user's interaction with said string-triggered visual image.

24. The method of claim 1 wherein the string-triggered visual image exhibits a behavior that is based, at least in part, on non-image data extracted form a profile maintained by said messaging system for a user from whom said trigger string was received.

25. The method of claim 24 wherein the behavior is based, at least in part, on how long the user has subscribed to said string-triggered visual image.

26. The method of claim 24 wherein the behavior is based, at least in part, on the user's subscriptions to other visual images.

27. The method of claim 26 wherein the behavior is exhibited in response to said user owning one or more other visual images that belong to a set to which said string-triggered visual image belongs.

28. The method of claim 1 wherein the trigger string is associated with a convention smiley combined with one or more additional textual characters.

29. A method for facilitating communications between participants, comprising the computer-implemented steps of:
receiving, from a particular user, through a messaging client, input text for a conversation;
determining that said input text includes a trigger-string associated with a visual image that exhibits a particular behavior;
determining that said user is subscribed to use said visual image;
wherein a subscription defines at least one of (a) a period of time during which the trigger string may be used, through the messaging client, to cause display of the visual image that exhibits the particular behavior or (b) a number of uses of the trigger-string, through the messaging client, to cause display of the visual image that exhibits the particular behavior;
wherein determining that said user is subscribed to use said visual image comprises:
if said subscription defines a period of time that said user may use said visual image, determining that said period of time has not lapsed;
if said subscription defines a number of uses that said user may use said visual image, determining that said number of uses has not been expended;
in response to determining that said user is subscribed to use said visual image, causing one or more messaging clients that are participating in said conversation to generate said visual image; and
wherein said computer-implemented steps of said method are performed by one or more computing devices.

30. A non-transitory computer-readable storage medium storing one or more sequences of instructions which, when executed by one or more processors, causes the one or more processors to perform operations comprising:
while a plurality of users are participating in a conversation, receiving a trigger string;

wherein text of the conversation is displayed within a shared conversation window displayed by at least a first messaging client and a second messaging client;

wherein, within the shared conversation window, a sequence in which text is entered determines a position of the text, relative to other text, in the shared conversation window;

wherein the first messaging client and the second messaging client belong to a messaging system;

wherein the trigger string was submitted through a text input interface provided by the first messaging client;

in response to receiving the trigger string through the text input interface provided by the first messaging client, causing at least (a) the first messaging client and (b) the second messaging client to generate an initial display of a string-triggered visual image;

wherein the initial display of the string-triggered visual image exhibits at least one of:

a behavior that is based, at least in part, on information obtained, after the trigger string is received through the text input interface provided by the first messaging client, from a service external to said messaging system, wherein the information obtained from the service includes textual data, and the textual data is obtained by the messaging system without involving the first messaging client and the second messaging client;

a behavior that causes the entire sting-triggered visual image to move from a first position to a second position, wherein moving from the first position to the second position changes the position of the entire string-triggered visual image relative to other previously-displayed elements of the conversation in the shared conversation window;

a behavior that is based, at least in part, on the presence of one or more other elements, distinct from the string-triggered visual image, displayed by the second messaging client, wherein the one or more other elements were displayed by the second messaging client before receiving the trigger string through the text input interface provided by the first messaging client;

a behavior that causes the string-triggered visual image to interact with one or more other elements, distinct from the string-triggered visual image, displayed by the first messaging client and second messaging client, in a manner that affects the display of the one or more other elements, wherein the one or more other elements include at least one of: textual elements of the conversation or another string-triggered visual image, included in the conversation, associated with a different trigger string than the trigger string received through the text input interface provided by the first messaging client;

a behavior that is affected with a power level associated with the string-triggered visual image;

a behavior that is based, at least in part, on results produced by a pseudo-random number generator;

a behavior that is manipulated by user input received through an input device after the trigger string is received through the text input interface provided by the first messaging client and the string-triggered visual image is displayed by the first messaging client and the second messaging client; or a behavior that is based, at least in part, on non-image data extracted from a profile maintained by said messaging system for a user from whom said trigger string was received.

31. The non-transitory computer-readable storage medium of claim 30 wherein the string-triggered visual image exhibits a behavior that is based, at least in part, on information obtained, after the trigger string is received through the text input interface provided by the first messaging client, from a service external to said messaging system, wherein the information obtained from the service includes textual data and the textual data is obtained by the messaging system without involving the first messaging client and the second messaging client.

32. The non-transitory computer-readable storage medium of claim 31 wherein the string-triggered visual image visually displays information obtained from the service.

33. The non-transitory computer-readable storage medium of claim 31 wherein the string-triggered visual image behaves in a manner that is based on information obtained from the service without displaying the information from the service.

34. The non-transitory computer-readable storage medium of claim 31 further comprising obtaining the information from the service based on information, maintained by the message system, about the user from whom said input was received.

35. The non-transitory computer-readable storage medium of claim 31 further comprising obtaining the information from the service based on information, maintained by the message system, about a user to whom the string-triggered visual image is to be displayed.

36. The non-transitory computer-readable storage medium of claim 30 wherein the string-triggered visual image exhibits a behavior that causes the entire string-triggered visual image to move from a first position to a second position, wherein moving from the first position to the second position changes the position of the entire string-triggered visual image relative to other previously-displayed elements of the conversation in the shared conversation window.

37. The non-transitory computer-readable storage medium of claim 36 wherein:

the input is textual input that includes a trigger string for the string-triggered visual image;

if displayed as text, the trigger string would be displayed at a particular text emoticon location within the conversation; and the string-triggered visual image is initially displayed at a location other than the particular text emoticon location.

38. The non-transitory computer-readable storage medium of claim 36 wherein:

the input is textual input that includes a trigger string for the string-triggered visual image;

if displayed as text, the trigger string would be displayed at a particular text emoticon location within the conversation; and the string-triggered visual image is initially displayed at the particular text emoticon location, and then moves to a location other that the particular text emoticon location.

39. The non-transitory computer-readable storage medium of claim 36 wherein:

the at least one messaging client displays the conversation in a shared conversation window that is displayed by a display device; and the string-triggered visual image is displayed at or moves to a position on the display device that is outside the shared conversation window.

40. The non-transitory computer-readable storage medium of claim 30 wherein the string-triggered visual image exhibits a behavior that is based, at least in part, on the presence of one or more other elements, distinct from the string-triggered visual image, displayed by the second messaging client, wherein the one or more other elements were displayed by the second messaging client before receiving the trigger string through the text input interface provided by the first messaging client.

41. The non-transitory computer-readable storage medium of claim 40 wherein the behavior changes a characteristic of a window on a display screen.

42. The non-transitory computer-readable storage medium of claim 41 wherein the characteristic is one of size or location.

43. The non-transitory computer-readable storage medium of claim 40 wherein:
the string-triggered visual image is a first string-triggered visual image; and
the one or more other elements is a second string-triggered visual image that is generated as part of said conversation.

44. The non-transitory computer-readable storage medium of claim 43 wherein the behavior includes interacting with said second string-triggered visual image.

45. The non-transitory computer-readable storage medium of claim 44 wherein the second string-triggered visual image is associated with a behavior that causes the second string-triggered visual image to interact with said first string-triggered visual image.

46. The non-transitory computer-readable storage medium of claim 40 wherein the one or more other elements includes text displayed in a display screen.

47. The non-transitory computer-readable storage medium of claim 46 wherein the string-triggered visual image interacts with text that is displayed as part of said conversation.

48. The non-transitory computer-readable storage medium of claim 30 wherein the string-triggered visual image exhibits a behavior that is based, at least in part, on results produced by a pseudo-random number generator.

49. The non-transitory computer-readable storage medium of claim 30 wherein the string-triggered visual image exhibits a behavior that is manipulated by user input received through an input device after the trigger string is received through the text input interface provided by the first messaging client and the string-triggered visual image is displayed by the first messaging client and the second messaging client.

50. The non-transitory computer-readable storage medium of claim 49 wherein movement of said string-triggered visual image is affected by manipulation of a user input device.

51. The non-transitory computer-readable storage medium of claim 49 wherein the string-triggered visual image includes user interface logic for receiving input.

52. The non-transitory computer-readable storage medium of claim 51 wherein the messaging system stores data, in association with a particular user, based on said particular user's interaction with said string-triggered visual image.

53. The non-transitory computer-readable storage medium of claim 30 wherein the string-triggered visual image exhibits a behavior that is based, at least in part, on non-image data extracted form a profile maintained by said messaging system for a user from whom said trigger string was received.

54. The non-transitory computer-readable storage medium of claim 53 wherein the behavior is based, at least in part, on how long the user has subscribed to said string-triggered visual image.

55. The non-transitory computer-readable storage medium of claim 53 wherein the behavior is based, at least in part, on the user's subscriptions to other visual images.

56. The non-transitory computer-readable storage medium of claim 55 wherein the behavior is exhibited in response to said user owning one or more other visual images that belong to a set to which said string-triggered visual image belongs.

57. The non-transitory computer-readable storage medium of claim 30 wherein the trigger string is associated with a convention smiley combined with one or more additional textual characters.

58. A non-transitory computer-readable storage medium storing one or more sequences of instructions which, when executed by one or more processors, causes the one or more processors to perform operations comprising:
receiving, from a particular user, through a messaging client, input text for a conversation;
determining that said input text includes a trigger-string associated with a visual image that exhibits a particular behavior;
determining that said user is subscribed to use said visual image;
wherein a subscription defines at least one of (a) a period of time during which the trigger string may be used, through the messaging client, to cause display of the visual image that exhibits the particular behavior or (b) a number of uses of the trigger-string, through the messaging client, to cause display of the visual image that exhibits the particular behavior;
wherein determining that said user is subscribed to use said visual image comprises:
if said subscription defines a period of time that said user may use said visual image, determining that said period of time has not lapsed;
if said subscription defines a number of uses that said user may use said visual image, determining that said number of uses has not been expended;
in response to determining that said user is subscribed to use said visual image, causing one or more messaging clients that are participating in said conversation to generate said visual image.

* * * * *